United States Patent
Pourshahid et al.

(10) Patent No.: US 10,580,017 B2
(45) Date of Patent: *Mar. 3, 2020

(54) USING ONTOLOGICAL DISTANCE TO MEASURE UNEXPECTEDNESS OF CORRELATION

(71) Applicant: International Business Machines Corporation, Armonk, NY (US)

(72) Inventors: Alireza Pourshahid, Ottawa (CA); Vinay N. Wadhwa, Ottawa (CA); Graham A. Watts, Ottawa (CA); Qing Wei, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 959 days.

This patent is subject to a terminal disclaimer.

(21) Appl. No.: 15/158,849

(22) Filed: May 19, 2016

(65) Prior Publication Data

US 2017/0116623 A1 Apr. 27, 2017

Related U.S. Application Data

(63) Continuation of application No. 14/919,228, filed on Oct. 21, 2015, now Pat. No. 10,062,084.

(51) Int. Cl.
*G06Q 30/02* (2012.01)

(52) U.S. Cl.
CPC ..... *G06Q 30/0201* (2013.01); *G06Q 30/0202* (2013.01)

(58) Field of Classification Search
CPC .......... G06F 17/2775; G06F 16/90344; G06K 9/6259; G06Q 10/06; G06Q 30/0201
See application file for complete search history.

(56) References Cited

U.S. PATENT DOCUMENTS

| 7,899,764 B2 | 3/2011 | Martin et al. |
| 2007/0118551 A1* | 5/2007 | Akkiraju ................ G06Q 10/06 |

(Continued)

OTHER PUBLICATIONS

List of IBM Patents or Patent Applications Treated as Related, May 19, 2016, pp. 1-2.

(Continued)

*Primary Examiner* — Etienne P Leroux
(74) *Attorney, Agent, or Firm* — Robert A. Voigt, Jr.; Winstead PC

(57) ABSTRACT

A method, system and computer program product for evaluating the interestingness of correlated data. The fields of a dataset are classified by tagging the fields in terms of real world concepts. A correlation analysis on the dataset is performed to generate a correlation coefficient for each pair of fields of correlated data items. An "ontological distance" between the tagged concepts for each pair of fields of correlated data items represented as nodes in the ontology is determined. A score is generated indicating an interestingness of correlation for each pair of fields of correlated data items based on the correlation coefficient and the ontological distance between the tagged concepts for each pair of fields of correlated data items. By utilizing the ontological distance with the correlation analysis to determine the interestingness of correlation, correlations that may not be obvious to users and unexpectedly correlated may be identified.

7 Claims, 3 Drawing Sheets

(56) References Cited

U.S. PATENT DOCUMENTS

| | | |
|---|---|---|
| 2011/0078187 A1 | 3/2011 | Lim et al. |
| 2012/0179682 A1 | 7/2012 | De Saeger et al. |
| 2012/0215777 A1* | 8/2012 | Malik .................. G06K 9/6259 707/737 |
| 2013/0096944 A1 | 4/2013 | Shah et al. |
| 2013/0185303 A1* | 7/2013 | Ceusters ............. G06F 17/2775 707/737 |
| 2014/0006369 A1* | 1/2014 | Blanchflower ... G06F 16/90344 707/706 |

OTHER PUBLICATIONS

Office Action for U.S. Appl. No. 14/919,228 dated Oct. 16, 2017, pp. 1-23.
Jean-Claude Franchitti, "Data Mining: Session 6—Main Theme Mining Frequent Patterns, Association, and Correlations," http://www.nyu.edu/classes/jcf/g22.3033-002/slides/session6MiningFrequentPatternsAssociationAndCorrelations.pdf, 2010, pp. 1-66, see pp. 5-6 and 31-34.
Huynh et al., "A Graph-based Clustering Approach to Evaluate Interestingness Measures: A Tool and a Comparative Study," Quality Measures in Data Mining, Springer, 2007, pp. 25-50.
Sridevi, U. K, et al., "Ontology Based Correlation Analysis in Information Retrieval," International Journal of Recent Trends in Engineering, vol. 2, No. 1, Nov. 2009, pp. 134-137.
Tew et al., "Behavior-Based Clustering and Analysis of Interestingness Measures for Association Rule Mining," Data Mining and Knowledge Discovery, vol. 28, Issue 4, Jul. 2014, pp. 1004-1045.

\* cited by examiner

USING ONTOLOGICAL DISTANCE TO MEASURE UNEXPECTEDNESS OF CORRELATION

TECHNICAL FIELD

The present invention relates generally to statistical correlation, and more particularly to using ontological distance in combination with statistical correlation analysis to evaluate the interestingness of the correlated data.

BACKGROUND

Correlation analysis measures the relationship between two data items, for example, a security's price and an indicator or the sales of jam and bread. The resulting value (called the "correlation coefficient") is a measure of how a change in one data item (e.g., an indicator) will likely result in a change in the other data item (e.g., the security's price), where the correlation coefficient can range between ±1.0 (plus or minus one). A positive correlation means that positive changes in one of the data items will likely result in a change in the positive direction in the other data item. Conversely, a negative correlation means that positive changes in one of the data items will likely result in a change in the negative direction in the other data item. Such correlation analysis is used throughout the business and scientific community to identify items that relate to one another. For example, it can be established that the sales of jam and bread are related to one another because they have a high correlation.

However, correlation analysis is limited in that it only establishes the degree of correlation in which two items relate mathematically. For example, the correlation analysis involving the items of jam and bread only indicate the degree in which such items are related mathematically. Correlation analysis does not provide any indication regarding how interesting is the correlation between the data items. For example, it may be more interesting to the user that there is a relationship between the sales of jam and the number of tornado warnings in a geographical region than the correlation between the sales of jam and bread even though the correlation between the sales of jam and the number of tornado warnings is less than the correlation between the sales of jam and bread.

As a result, there have been approaches to evaluate the "interestingness" of the correlation of data items. However, such approaches rely on the use of statistical metrics, such as support and confidence, to refine the correlations and discard statistically uninteresting results. These approaches fail to consider how these data items relate in the physical real world based on the data items themselves. That is, these approaches fail to surface correlations between data items that are not obvious to users and are unexpectedly correlated since these approaches rely solely on mathematical analysis.

SUMMARY

In one embodiment of the present invention, a method for evaluating the interestingness of correlated data comprises receiving a dataset representing a collection of data for a collection of data items. The method further comprises classifying fields of the dataset by tagging the fields in terms of concepts. The method additionally comprises performing, by a processor, a correlation analysis on the dataset to generate a correlation coefficient for each pair of fields of correlated data items representing a degree of correlation as to how a change in value in one data item will likely result in a change in value in the other correlated data item. Furthermore, the method comprises determining, by the processor, an ontological distance between the tagged concepts for each pair of fields of the correlated data items represented as nodes in an ontology, where the ontology illustrates degrees of relatedness between the tagged concepts in the real world. Additionally, the method comprises generating, by the processor, a score indicating an interestingness of correlation for each pair of fields of the correlated data items based on the correlation coefficient for each pair of fields of the correlated data items and the ontological distance between the tagged concepts for each pair of fields of the correlated data items.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

Figure 1:
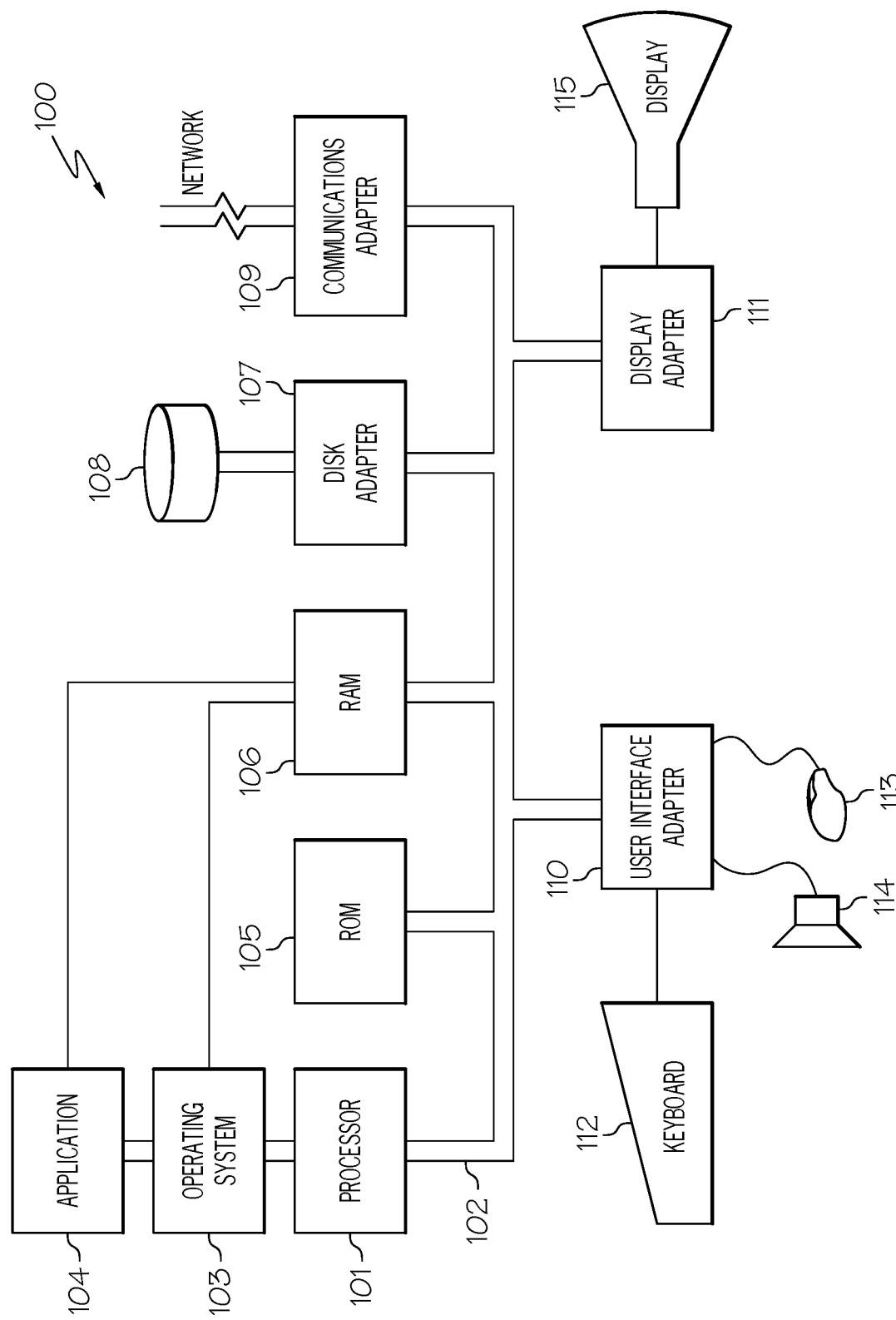
FIG. 1 illustrates a hardware configuration of a computer system configured in accordance with an embodiment of the present invention.

The present invention comprises a method, system and computer program product for evaluating the interestingness of correlated data. In one embodiment of the present invention, a dataset representing a collection of data for a collection of data items (e.g., sales information for various consumer goods, such as jam and bread) is received. The fields of the dataset are classified by tagging the fields in terms of real world concepts. The fields of the dataset refer to the values of data for a particular data item, such as the sales data for jam. For example, a field containing sales data for jam would be tagged with the real world concept of jam. A correlation analysis on the dataset is performed to generate a correlation coefficient for each pair of fields of correlated data items representing a degree of correlation as to how a change in value in one data item will likely result in a change in value in the other correlated data item. For example, a statistical correlation analysis may be performed between the sales of jam and bread. The resulting statistical correlation analysis may generate a correlation coefficient of 0.8, which indicates a high positive correlation. An "ontological distance" between the tagged concepts (e.g., jam, bread, tornado warnings) for each pair of fields of correlated data items (e.g., sales of jam and bread, sales of jam over a period of time and number of tornado warnings over the same period of time) represented as nodes in an ontology is determined. An ontology illustrates degrees of relatedness between the tagged concepts in the real world. As used herein, the "ontological distance" between the tagged concepts measures the conceptual similarity between these tagged concepts based on the distance between the nodes in the ontology corresponding to those concepts, such as the number of nodes traversed between these nodes in the ontology. A score is generated indicating an interestingness of correlation for each pair of fields of correlated data items based on the correlation coefficient for each pair of fields of correlated data items and the ontological distance between the tagged concepts for each pair of fields of correlated data items. By utilizing the ontological distance, which considers how data items relate in the physical real world, with the correlation analysis to determine the interestingness of correlation, correlations that may not be obvious to users and unexpectedly correlated may be identified. In this manner, a more effective approach is established in determining the interestingness of correlation between data items.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Referring now to the Figures in detail, FIG. 1 illustrates a hardware configuration of a computer system 100 which is representative of a hardware environment for practicing the present invention. Computer system 100 has a processor 101 coupled to various other components by system bus 102. An operating system 103 runs on processor 101 and provides control and coordinates the functions of the various components of FIG. 1. An application 104 in accordance with the principles of the present invention runs in conjunction with operating system 103 and provides calls to operating system 103 where the calls implement the various functions or services to be performed by application 104. Application 104 may include, for example, a program for evaluating the interestingness of correlated data using statistical correlation analysis in combination with ontological distance as discussed further below in association with FIGS. 2-3.

Referring again to FIG. 1, read-only memory ("ROM") 105 is coupled to system bus 102 and includes a basic input/output system ("BIOS") that controls certain basic functions of computer system 100. Random access memory ("RAM") 106 and disk adapter 107 are also coupled to system bus 102. It should be noted that software components including operating system 103 and application 104 may be loaded into RAM 106, which may be computer system's 100 main memory for execution. Disk adapter 107 may be an integrated drive electronics ("IDE") adapter that communicates with a disk unit 108, e.g., disk drive. It is noted that the program for evaluating the interestingness of correlated data using statistical correlation analysis in combination with ontological distance, as discussed further below in association with FIGS. 2-3, may reside in disk unit 108 or in application 104.

Computer system 100 may further include a communications adapter 109 coupled to bus 102. Communications adapter 109 interconnects bus 102 with an outside network thereby enabling computer system 100 to communicate with other such systems.

I/O devices may also be connected to computer system 100 via a user interface adapter 110 and a display adapter 111. Keyboard 112, mouse 113 and speaker 114 may all be interconnected to bus 102 through user interface adapter 110. A display monitor 115 may be connected to system bus 102 by display adapter 111. In this manner, a user is capable of inputting to computer system 100 through keyboard 112 or mouse 113 and receiving output from computer system 100 via display 115 or speaker 114.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, correlation analysis measures the relationship between two data items, for example, a security's price and an indicator or the sales of jam and bread. The resulting value (called the "correlation coefficient") is a measure of how a change in one data item (e.g., an indicator) will likely result in a change in the other data item (e.g., the security's price), where the correlation coefficient can range between ±1.0 (plus or minus one). A positive correlation means that positive changes in one of the data items will likely result in a change in the positive direction in the other data item. Conversely, a negative correlation means that positive changes in one of the data items will likely result in a change in the negative direction in the other data item. Such correlation analysis is used throughout the business and scientific community to identify items that relate to one another. For example, it can be established that the sales of jam and bread are related to one another because they have a high correlation. However, correlation analysis is limited in that it only establishes the degree of correlation in which two items relate mathematically. For example, the correlation analysis involving the items of jam and bread only indicate the degree in which such items are related mathematically. Correlation analysis does not provide any indication regarding how interesting is the correlation between the data items. For example, it may be more interesting to the user that there is a relationship between the sales of jam and the number of tornado warnings in a geographical region than the correlation between the sales of jam and bread even though the correlation between the sales of jam and the number of tornado warnings is less than the correlation between the sales of jam and bread. As a result, there have been approaches to evaluate the "interestingness" of the correlation of data items. However, such approaches rely on the use of statistical metrics, such as support and confidence, to refine the correlations and discard statistically uninteresting results. These approaches fail to consider how these data items relate in the physical real world based on the data items themselves. That is, these approaches fail to surface correlations between data items that are not obvious to users and are unexpectedly correlated since these approaches rely solely on mathematical analysis.

Figure 2:
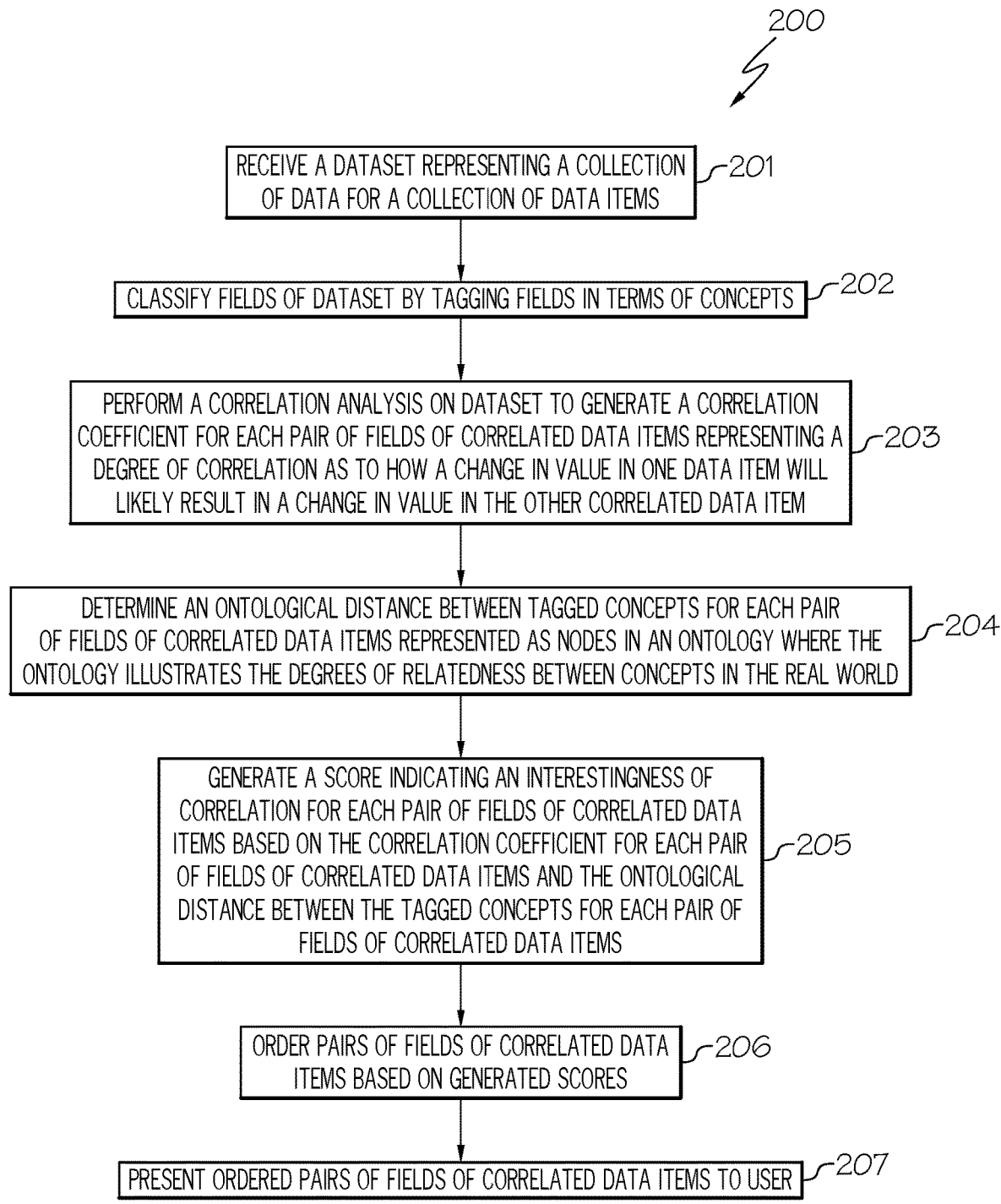
FIG. 2 is a flowchart of a method for evaluating the interestingness of correlated data using statistical correlation analysis in combination with ontological distance in accordance with an embodiment of the present invention.
Figure 3:
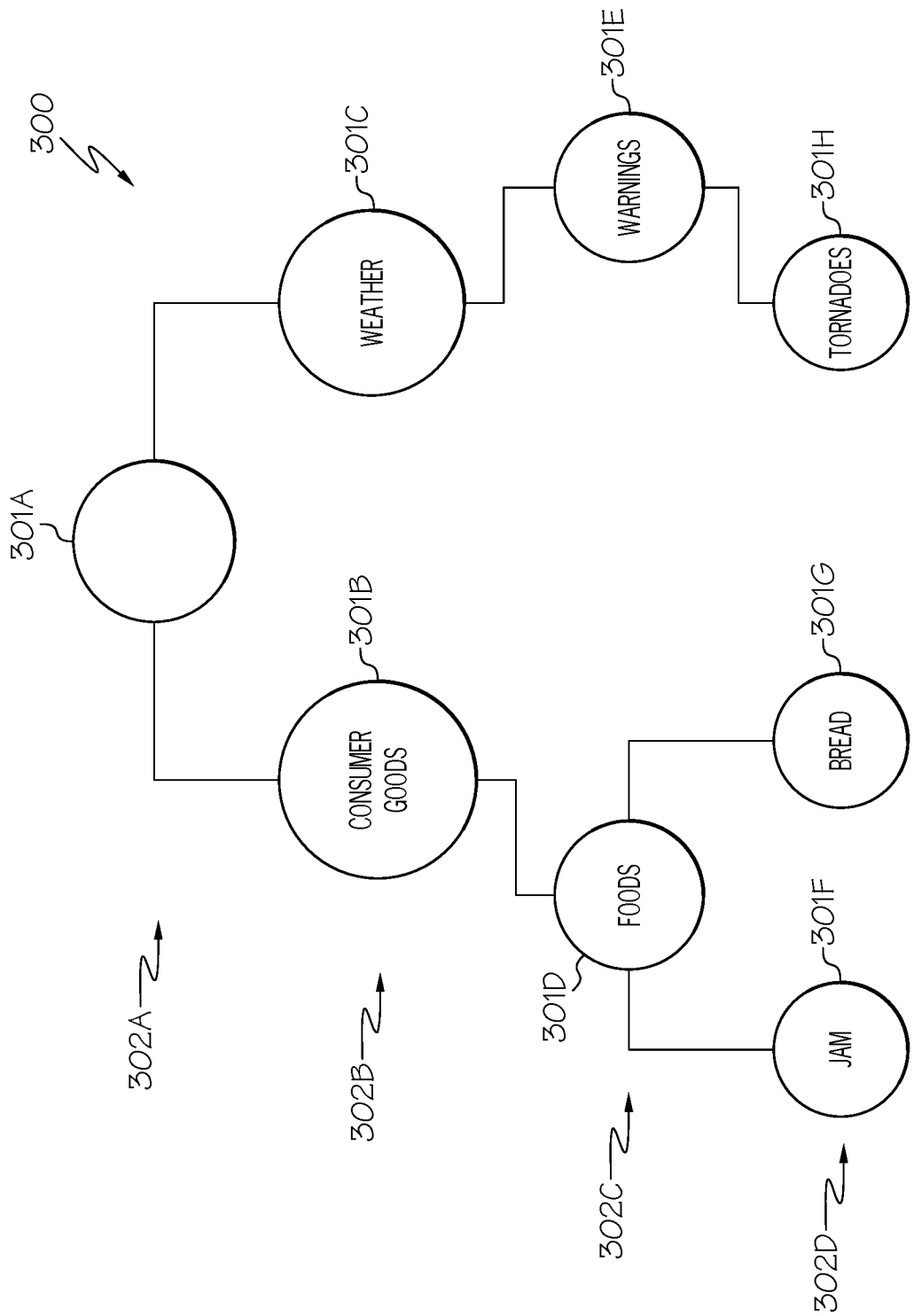
FIG. 3 illustrates an ontology representing concepts in the real world that were tagged to fields of a dataset in accordance with an embodiment of the present invention.

The principles of the present invention provide a means for evaluating the "interestingness" of the correlation of data items without relying solely on statistical metrics, but instead, consider how these data items relate in the physical real world by utilizing an ontological distance in addition to the statistical correlation analysis as discussed below in connection with FIGS. 2-3. FIG. 2 is a flowchart of a method for evaluating the interestingness of correlated data using statistical correlation analysis in combination with ontological distance. FIG. 3 illustrates an ontology representing concepts in the real world that were tagged to fields of a dataset.

As stated above, FIG. 2 is a flowchart of a method 200 for evaluating the interestingness of correlated data using statistical correlation analysis in combination with ontological distance in accordance with an embodiment of the present invention.

Referring to FIG. 2, in conjunction with FIG. 1, in step 201, a dataset representing a collection of data for a collection of data items is received. For example, a dataset may include sales information for various consumer goods, such as food products (e.g., jam and bread) as well as other information that may seem unrelated, such as weather warnings (e.g., instances of tornado warnings).

In step 202, the fields of the dataset are classified by tagging the fields in terms of real world concepts. The fields of the dataset refer to the values of data for a particular data item, such as the sales data for jam. For example, a field containing sales data for jam would be tagged with the real world concept of jam. In another example, a field containing sales data for bread would be tagged with the real world concept of bread. In a further example, a field containing a time and/or a number of instances of tornado warnings over a period of time would be tagged with the real world concept of tornado warnings. In one embodiment, the fields of the dataset correspond to the columns of a list dataset. In one embodiment, the fields of the dataset are tagged in terms of real world concepts using the metadata of the dataset.

In step 203, a correlation analysis on the dataset is performed to generate a correlation coefficient for each pair of fields of correlated data items representing a degree of correlation as to how a change in value in one data item will likely result in a change in value in the other correlated data item. Various correlation analyses may be performed, such as canonical and two-dimensional, on the dataset. The principles of the present invention are not to be limited in scope to any particular type of correlation analysis. The principles of the present invention are to include any type of correlation analysis, including statistical correlation analysis. A person of ordinary skill in the art would be capable of applying the principles of the present invention to such implementations. Further, embodiments applying the principles of the present invention to such implementations would fall within the scope of the present invention.

For example, a statistical correlation analysis may be performed between the sales of jam and bread. The resulting statistical correlation analysis may generate a correlation coefficient of 0.8, which indicates a high positive correlation. In one embodiment, the correlation coefficient can range between ±1.0 (plus or minus one). A positive correlation means that positive changes in one of the data items will likely result in a change in the positive direction in the other data item. Conversely, a negative correlation means that positive changes in one of the data items will likely result in a change in the negative direction in the other data item.

In another example, a statistical correlation analysis may be performed between the sales of jam over a period of time and the number of tornado warnings over the same period of time. The resulting statistical correlation analysis may generate a correlation coefficient of 0.65, which indicates a positive correlation that is relatively high though not as highly correlated as the correlation between the sales of jam and bread (had the correlation coefficient of 0.8).

In step 204, an "ontological distance" between the tagged concepts (e.g., jam, bread, tornado warnings) for each pair of fields of correlated data items (e.g., sales of jam and bread, sales of jam over a period of time and number of tornado warnings over the same period of time) represented as nodes in an ontology is determined. An ontology illustrates degrees of relatedness between the tagged concepts in the real world. An "ontological distance," as used herein, measures the conceptual similarity between these tagged concepts. In one embodiment, the ontology may be represented as a tree structure (discussed below in connection with FIG. 3) or a graphical structure. The principles of the present invention are not to be limited in scope to any particular ontological structure. The principles of the present invention are to include any type of ontological representation. A person of ordinary skill in the art would be capable of applying the principles of the present invention to such implementations. Further, embodiments applying the principles of the present invention to such implementations would fall within the scope of the present invention.

For example, FIG. 3 illustrates an ontology represented as a tree structure 300 containing a hierarchy of nodes 301A-301H representing concepts in the real world that were tagged to fields of a dataset in accordance with an embodiment of the present invention.

As illustrated in FIG. 3, tree structure 300 includes various levels 302A-302D of nodes 301A-301H, where each of these nodes 301A-301H represents a concept in the real world that was tagged to a field of dataset. Nodes 301A-301H may collectively or individually be referred to as nodes 301 or node 301, respectively. Levels 302A-302D may collectively or individually be referred to as levels 302 or level 302, respectively.

In one embodiment, tree structure 300 includes a root node 301A that corresponds to the first level 302A of tree structure 300. Root node 301A includes one or more children in a second level 302B, such as node 301B corresponding to the real world concept of consumer goods and node 301C corresponding to the real world concept of weather 301. Nodes 301B, 301C may each have one or more children in a third level 302C, where node 301B has the child node 301D corresponding to the real world concept of foods and node 301C has the child node 301E corresponding to warnings. Furthermore, nodes 301D, 301E may each have one or more children in a fourth level 302D, where node 301D has the child nodes 301F, 301G corresponding to the real world concepts of jam and bread, respectively, and node 301E has the child node 301H corresponding to tornado warnings.

The lines connecting nodes 301 are called "branches." Nodes 301 without children are called leaf nodes, "end-nodes," or "leaves."

In one embodiment, tree structure 300 illustrates the degree of relatedness between concepts in the real world based on the distance between the nodes corresponding to those concepts. Such a distance is referred to herein as the "ontological distance." The ontological distance measures the conceptual similarity between these concepts. For example, the degree of relatedness between the concept of jam, represented by node 301F, and the concept of tornado warnings, represented by node 301H, corresponds to the number of nodes 301 traversed from node 301F to node 301H, which as illustrated in FIG. 3, corresponds to the distance (referred to as the "ontological distance") of 6. In another example, the ontological distance between the tagged concepts of jam and bread in tree structure 300 is 2.

In one embodiment, the smaller the ontological distance between nodes 301, the greater the correlation between the real world concepts corresponding to those nodes 301. Conversely, the larger the ontological distance between nodes 301, the less the correlation between the real world concepts corresponding to those nodes 301.

In one embodiment, the ontological distance can be a weighted value in that the distance between certain nodes in the ontology is weighted higher/lower than the distance between other nodes in the ontology.

While FIG. 3 illustrates a tree structure 300 that includes four levels 302, tree structure 300 may include any number of levels 302. Furthermore, tree structure 300 may include any number of nodes 301 with any number of child nodes 301.

In step 205, a score is generated indicating an interestingness of correlation for each pair of fields of correlated data items based on the correlation coefficient for each pair of fields of correlated data items (obtained in step 203) and the ontological distance between the tagged concepts for each pair of fields of correlated data items (obtained in step 204). In one embodiment, such a score corresponds to multiplying the correlation coefficient with the ontological distance for the pair of fields of correlated data items. For example, if the correlation coefficient for the sales of jam and bread corresponded to a value of 0.8 and the ontological distance between the tagged concepts of jam and bread corresponded to a value of 2, then the score indicating the interestingness of correlation would be 0.8*2=1.6. In another example, if the correlation coefficient for the sales of jam and the number of tornado warnings over the same period of time corresponded to a value of 0.65 and the ontological distance between the tagged concepts of jam and bread corresponded to a value of 6, then the score indicating the interestingness of correlation would be 0.65*6=3.9.

In one embodiment, the score generated in step 205 is based on a weight applied to the correlation coefficient and/or the value representing the ontological distance.

In one embodiment, the higher the score of step 205, the greater the interestingness of correlation for that pair of fields of correlated data items. By utilizing the ontological distance, which considers how data items relate in the physical real world, with the correlation analysis to determine the interestingness of correlation, correlations that may not be obvious to users and unexpectedly correlated may be identified. For example, the value of the interestingness of correlation between the sales of jam and the number of tornado warnings over the same period of time is greater than the value of interestingness of correlation between the sales of jam and bread. Such a correlation would not have been obvious to users. By utilizing an ontological distance to consider how data items relate in the physical real world in combination with the correlation analysis that establishes how data items relate mathematically, a more effective approach is established in determining the interestingness of correlation between data items.

In step 206, the pairs of fields of correlated data items are ordered based on the scores generated in step 205, such as ordered from the highest score to the lowest score.

In step 207, the ordered pairs of fields of correlated data items are presented to the user, such as via display 115.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for evaluating the interestingness of correlated data, the method comprising:
   receiving a dataset representing a collection of data for a collection of data items;
   classifying fields of said dataset by tagging said fields in terms of concepts;
   performing, by a processor, a correlation analysis on said dataset to generate a correlation coefficient for each pair of fields of correlated data items representing a degree of correlation as to how a change in value in one data item will likely result in a change in value in the other correlated data item;
   determining, by said processor, an ontological distance between said tagged concepts for each pair of fields of said correlated data items represented as nodes in an ontology, wherein said ontology illustrates degrees of relatedness between said tagged concepts in the real world; and
   generating, by said processor, a score indicating an interestingness of correlation for each pair of fields of said correlated data items based on said correlation coefficient for each pair of fields of said correlated data items and said ontological distance between said tagged concepts for each pair of fields of said correlated data items.

2. The method as recited in claim 1 further comprising:
   ordering said pairs of fields of said correlated data items based on said generated scores.

3. The method as recited in claim 2 further comprising:
   presenting said ordered pairs of fields of said correlated data items to a user.

4. The method as recited in claim 1, wherein said ontological distance between said tagged concepts for each pair of fields of said correlated data items in said ontology is based on a number of nodes traversed from a first node to a second node in said ontology, wherein said first node represents a first field of a pair of fields of said correlated data items tagged by a first concept, wherein said second node represents a second field of said pair of fields of said correlated data items tagged by a second concept.

5. The method as recited in claim 1, wherein said score is generated based on multiplying a value of said correlation coefficient with a value representing said ontological distance.

6. The method as recited in claim 5, wherein said score is generated based on a weight applied to said correlation coefficient and/or said value representing said ontological distance.

7. The method as recited in claim 1, wherein said fields of said dataset are tagged in terms of concepts using metadata of said dataset.

* * * * *